Oct. 25, 1932.   P. H. STANLEY   1,884,905
AIRCRAFT SUSTAINING ROTOR AND METHOD OF MAKING THE SAME
Original Filed Feb. 27, 1931   3 Sheets-Sheet 1

Oct. 25, 1932.   P. H. STANLEY   1,884,905
AIRCRAFT SUSTAINING ROTOR AND METHOD OF MAKING THE SAME
Original Filed Feb. 27, 1931   3 Sheets-Sheet 2
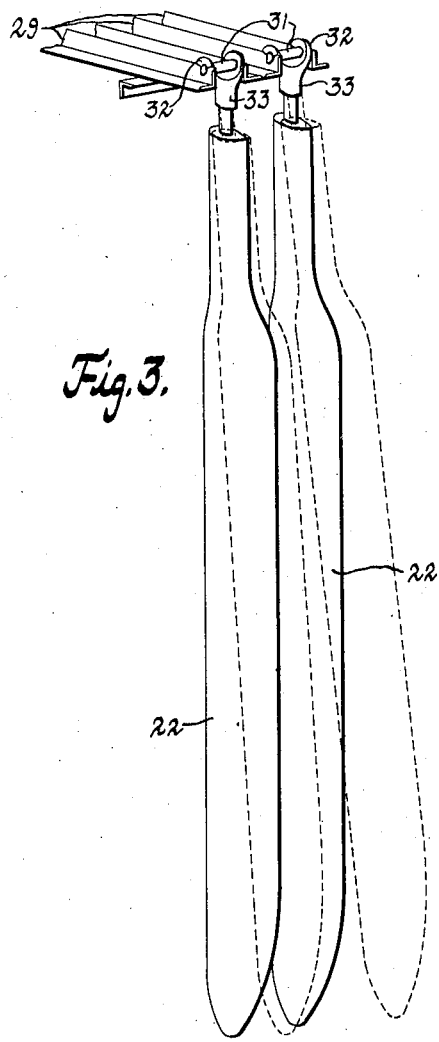
Fig. 3.
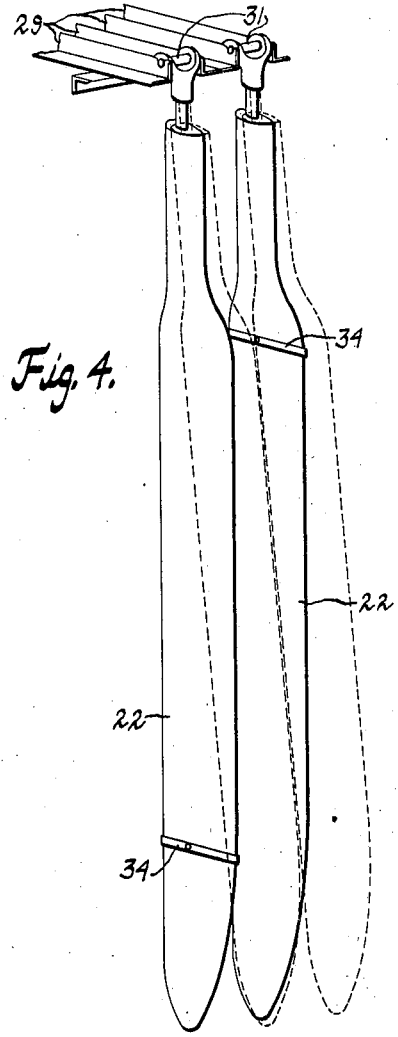
Fig. 4.
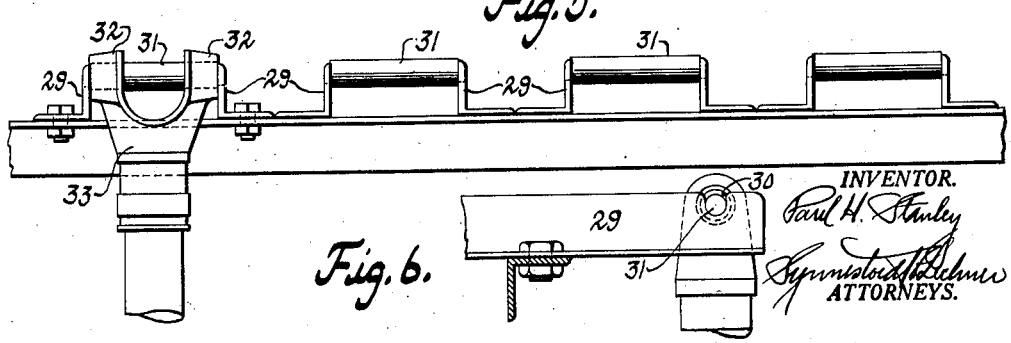
Fig. 5.
Fig. 6.
INVENTOR.
Paul H. Stanley
ATTORNEYS.

Oct. 25, 1932.                P. H. STANLEY                1,884,905
AIRCRAFT SUSTAINING ROTOR AND METHOD OF MAKING THE SAME
              Original Filed Feb. 27, 1931     3 Sheets-Sheet 3
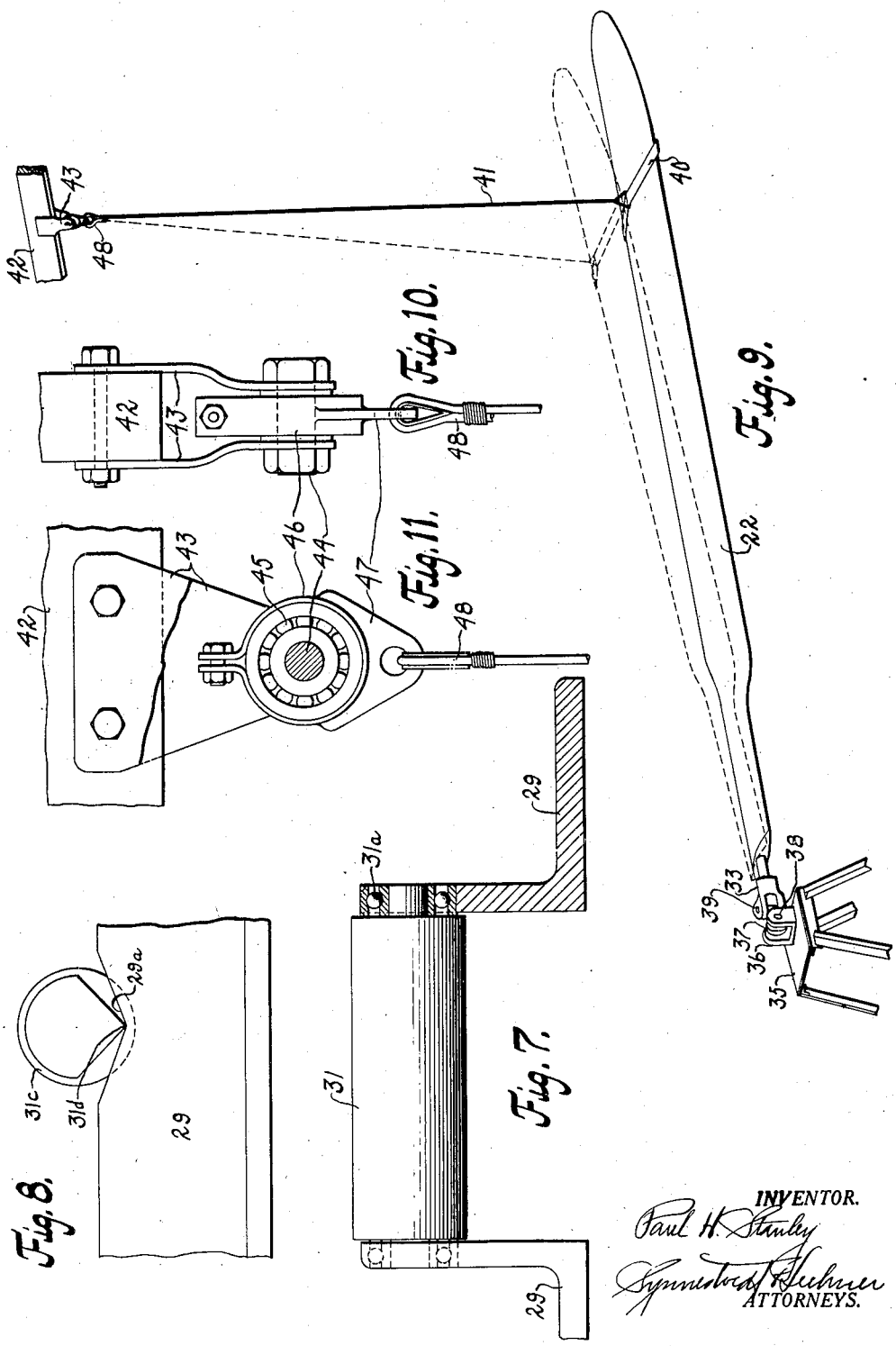
INVENTOR.
Paul H. Stanley
ATTORNEYS.

Patented Oct. 25, 1932

1,884,905

UNITED STATES PATENT OFFICE

PAUL H. STANLEY, OF GLENSIDE, PENNSYLVANIA, ASSIGNOR TO AUTOGIRO COMPANY OF AMERICA, OF PHILADELPHIA, PENNSYLVANIA, A CORPORATION OF DELAWARE

AIRCRAFT SUSTAINING ROTOR AND METHOD OF MAKING THE SAME

Application filed February 27, 1931, Serial No. 518,638. Renewed January 26, 1932.

This invention relates to aircraft sustaining rotors and a method of making or manufacturing the same. The invention is particularly concerned with the general type of sustaining rotor construction in which a plurality of blades are mounted for rotation about a common axis with freedom for movement of one blade with respect to another, preferably within, as well as transversely of, the general path of travel of the set, as by means of pivoted or articulated joints. Furthermore, the present invention is especially useful in connection with rotor constructions of this particular type in which the sustaining blades or rotor system is arranged or mounted for free rotation under the influence of relative air-flow, such, for example, as results from movement of the craft in the atmosphere.

Generally considered, the present invention has as its primary object the provision of a sustaining rotor construction which is capable of the smoothest possible operation during flight. To this end, the present invention contemplates a particular type of balance as between the several blades of the rotor construction, as well as a method of accomplishing or bringing about such balance, in order that vibrations and strains of various kinds, on the rotor itself as well as on the supporting structure therefor, may be reduced to a minimum.

More specifically, the present invention contemplates the pendular balancing of the individual blades of a rotor construction, relatively to each other, in order that centrifugal, drag and anti-drag, dynamic and other forces acting on the blades in flight operation will not set up certain undesirable blade swinging movements, the possible character of which will be referred to more fully hereinafter.

I recognize the fact that it has been contemplated to produce symmetrical rotors, balanced as to weight on all sides, so that centrifugal force acting upon the weight thereof shall not produce wabbling or vibration of the rotor on its axis when in rotation, but I contemplate, while maintaining such approximate balance, a construction in which the individual blades of the rotor are subsequently pendularly balanced, with respect to each other, on their pivots, so that not only the entire unit, which has a normally substantially uniform rotation in flight, is in balance, but also the separately articulated blades, which have normally non-uniform and unsymmetrical oscillation in flight, shall nevertheless be of the same inherent period of pendular oscillation, regardless of inaccuracies or variances in weights, or centres of gravity, or other characteristics unavoidably occurring in manufacture.

Since it is important that the rotor as a whole be regular and smooth in its rotation, it would seem logical to balance the rotor as a whole, after manufacture (for example to balance it as is done with engine crankshafts), but I have found that this does not correct the tendency of the rotor to operate roughly at least under certain flight conditions.

I have further found that this difficulty is apparently due to the setting up of resonant oscillations of the blades, on their articulations, with respect to each other or to certain speeds of rotation, directly or harmonically, even when the rotor has been balanced as to weight after manufacture. Even though the blades are individually articulated to the hub, it appears that the building up of an oscillation of one blade foreign to the normal irregular oscillation of the blade by flight forces, acts through the hub and other pivots to disturb the operation of another or other blades and the rotor as a whole. However, whatever may be the cause of rough rotor operation, I correct or minimize such tendency by relatively pendularly balancing the individual blades of the rotor on their pivots, i. e., making each blade of the set of inherent pendular action equal to that of the other blades, even though they may then have slight variations as to centre of gravity or in other respects.

How the foregoing objects and advantages are attained and, more particularly, how the method of balancing the individual blades is carried out, will be clear from a consideration of the following description taken with the accompanying drawings, in which Figure 1 is a top plan view of an aircraft of the type above referred to, to which the rotor construction of the present invention is applied, certain portions of the craft as well as of the rotor construction being broken away;

Figure 3 is a view illustrating somewhat diagrammatically certain apparatus which may be employed in carrying out the method herein disclosed of balancing rotor blades, two such blades being arranged, with respect to the apparatus, in position for balancing;

Figure 4 is a view similar to Figure 3 but illustrating a pair of blades with certain weight devices applied thereto in order to accomplish the balancing;

Figures 5 and 6 are views of certain portions of an apparatus similar to that of Figures 3 and 4;

Figure 7 is a view illustrating certain details of the apparatus of Figures 3 to 6 inclusive;

Figure 8 is a view similar to Figure 7, of a modified construction;

Figure 9 is a perspective view illustrating a different mode or manner of accomplishing the balancing, as well as suitable apparatus by which this balancing may be effected; and Figures 10 and 11 are views illustrating a certain detail of the structure illustrated in Figure 9.

Figure 1:
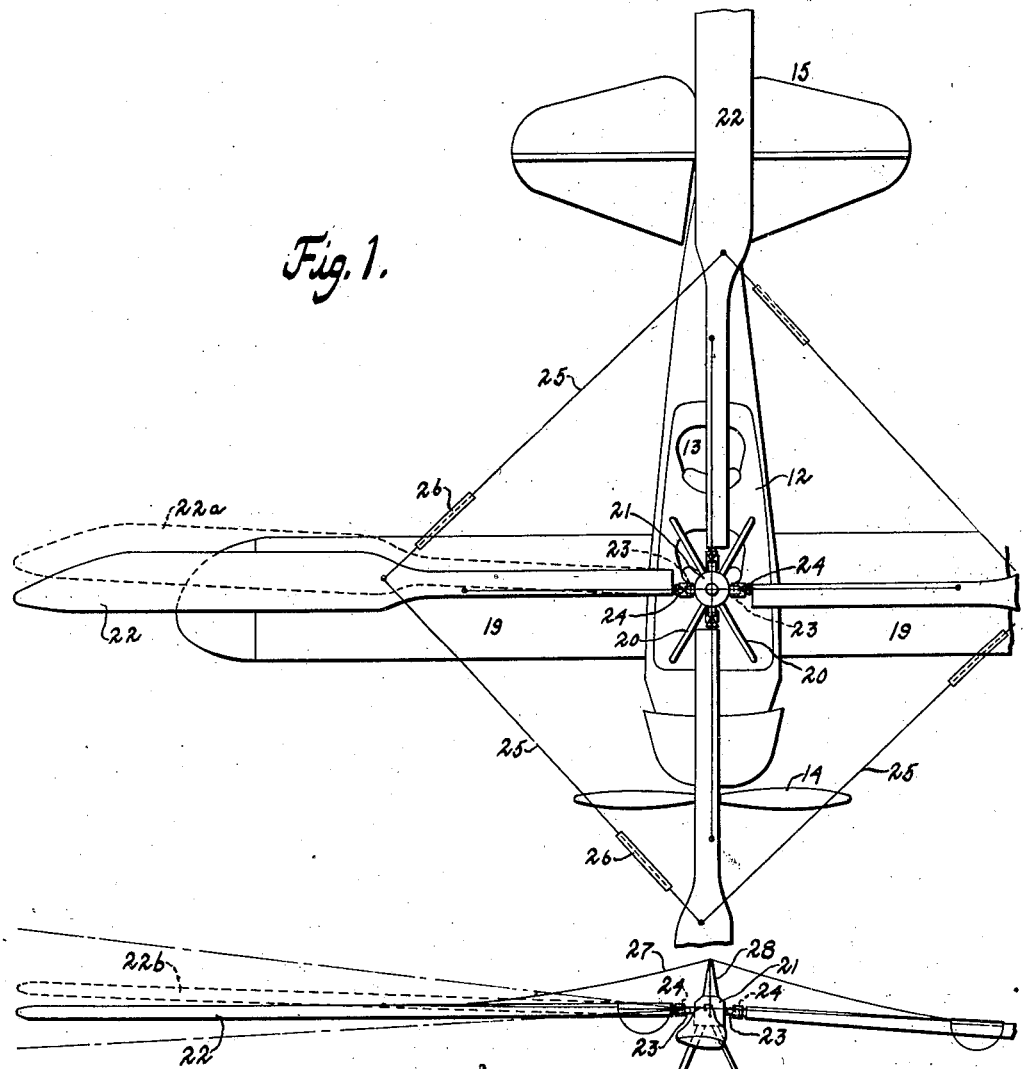
Figure 2:
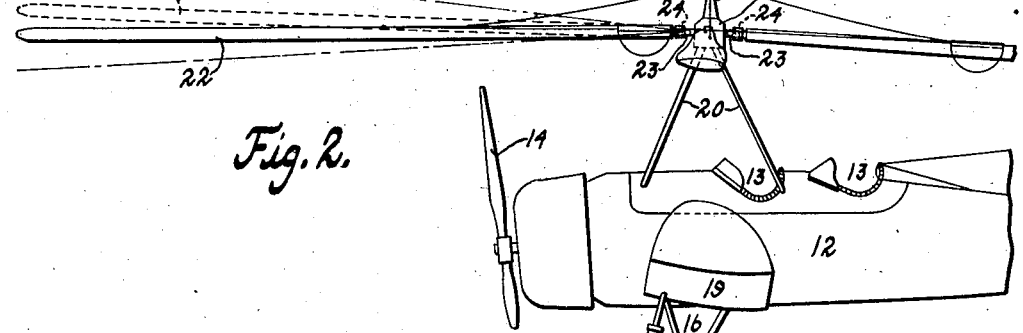
Figure 2 is a side elevational view of the craft of Figure 1, also having certain parts broken away.

In Figures 1 and 2 the reference character 12 indicates the body or fuselage of an aircraft in which one or more cockpits 13 may be provided. The craft, of course, is equipped with suitable forward propelling means such as indicated at 14, a tail structure 15 including control and stabilizing surfaces, and an undercarriage indicated in general at 16, preferably provided with landing wheels 17 and shock absorbers 18. In addition, relatively small fixed wing members 19 are arranged laterally of the fuselage 12.

The rotor construction of the present invention is preferably mounted or supported on a pylon structure having legs 20 which converge upwardly from the fuselage 12 in order to support an axis member on which the rotor hub 21 is mounted for free rotation.

In the preferred arrangement, the individual rotor blades 22 are mounted, at their hub ends, on the hub 21 with freedom for movement thereof within as well as transversely of the general path of travel of the set of blades. This swinging movement is preferably provided for by means of substantially horizontally disposed pivots 23 and substantially vertically disposed pivots 24. Movement of one of the blades 22 on its vertical pivot 24 is indicated in dotted lines in Figure 1 at 22a, while a similar movement on a horizontal pin 24 is indicated by the dotted showing at 22b in Figure 2. The flexible mounting of the rotor blades for pivotal movement in a plurality of directions is not claimed herein as a part of the present invention per se, but is described and claimed in the copending application of Juan de la Cierva, Serial No. 145,655, filed November 1, 1926.

Additionally, the rotor blades may also be provided with interconnections comprising cable sections 25 in which an elastic or resilient device 26 is disposed, such interconnections being employed for the purpose of yieldingly restricting at least certain abnormal or relatively large individual blade movements within the general path of travel thereof. In order to support the blades when they are inactive, supporting wires or cables 27 are preferably attached to the blades at points located substantially from the center of rotation, the wires being extended therefrom to the cone or tip portion 28 of the rotor hub. It should be understood, of course, that the cables 27 merely serve to prevent downward swinging of the blades, when they are not active to support the craft, to positions in which they would strike or rest upon any other portion of the craft. Furthermore, the cables 27 are arranged in such manner as to impose no restraint whatever on the normal movements of the blades on their horizontally disposed pivots. The condition or character of the balance of the blades with respect to each other will be more apparent from a consideration of the following discussion of the manner in which the pendular balance, above referred to, is accomplished, or brought about.

Referring now to Figures 3 to 7 inclusive, according to the present invention one or more rotor blades 22 are hung or suspended from a supporting structure which may be composed of suitable angle members 29, arranged in pairs and provided, in corresponding edges of those in each pair, with cut out or recessed portions 30 (see Fig. 6) which are adapted to receive pins 31. The pins 31, in turn, are preferably machined to fit the apertures formed in the lugs 32 of the blade pivot parts 33. At this point it should be noted that the blade pivot parts 33, with their apertured lugs 32, are portions of the construction which co-operate, after final assembly, with the substantially vertically disposed pivot pins 24 illustrated in Figures 1 and 2 and described above. It should also be borne in mind that the supporting structure which I preferably employ in carrying out the present method of balancing rotor blades, may be arranged to be used in connection with only one blade at a time or with two blades (see Figs. 3 and 4) or, still further, with any convenient number of blades, for example, as indicated in Figure 5, Before pendularly balancing the blades in the manner now to be described, they are preferably brought into static balance both with respect to their total weights as well as with respect to the location of the center of gravity thereof from their hub ends. After this static balance, preferably, the blades of any particular rotor construction or system are swung or suspended in pairs as indicated in Figures 3 and 4, in order to determine which blades of the set have, respectively, the longest and the shortest periods of pendular oscillation. When these two blades are found they are, preferably, swung together, as a pair, with adjustable weight devices, such as those indicated at 34 in Figure 4, applied thereto. These devices are preferably of equal weight and are arranged in such manner as to be movable or adjustable lengthwise of the blades to positions such as illustrated in Figure 4, it being noted that in this particular figure the device on one blade is located relatively close to the tip portion thereof, while the device on the other blade is positioned close to its hub end. By swinging this pair of blades adjacent to each other in this manner and suitably adjusting the position of the weight device 34 on each, the natural pendular period of oscillation of the blades of the pair may be equalized. In Figure 3 this pair of blades is indicated before application of the weight devices, while in Figure 4 the same pair is shown with the said devices applied.

After this equalization of the blades having the longest and shortest periods, one or the other of them is preferably swung or suspended alongside of a blade having an intermediate period to which a similar weight device 34 has been applied. In this way the third and fourth and, indeed, any number of additional blades, may be brought into pendular balance with either one of the first two tested, it being understood, of course, that with each blade which is set up alongside of the "master" blade, its weight device will be suitably adjusted in order to bring its period to that of the "master."

Alternatively, each blade may be swung individually and suitably timed in order to determine its pendular period, after which any necessary adjustments may be made by means of the weight devices 34 in order to bring its pendular period into conformity with that of the "master." It will also be apparent, of course, that, if desired, a set of three, four, or even more blades may be suspended and tested at one time as by means of a supporting structure such as indicated in Figure 5.

After pendular balance of the blades in accordance with the foregoing, permanent alterations in the weights of the blades are preferably made and the temporary and adjustable devices 34 removed. Such alterations, of course, should be effected while maintaining the total weight of each individual blade equal to that of the others. The preferred manner of permanently altering the blade weights, especially where relatively small changes are being made, involves the application of blade surfacing or coating material such as shellac, paint, "dope," or the like in or to portions of the blades in the vicinity of the positions formerly occupied by the temporary and adjustable devices 34. This, in effect, results in an irregular or uneven application of the usual blade surfacing material and is particularly advantageous as it does not materially alter the blade contour or surface characteristics. It will be understood, of course, that the additional surfacing material which is applied to any particular blade is substantially equal in weight to the weight devices 34. This manner of permanent addition of weight to the blades has other important advantages such, for example, as ease of application. In addition, a smooth blade surface is maintained and the covering thereof need not be broken or disturbed in any way.

The permanent alteration in the weight of the blades may be accomplished by other means. For example, a small hole, or small holes, may be drilled in the blade covering at some suitable point and a small weight, in the form of a plug, inserted in such manner as to provide a smooth blade surface. Still further, if desired, thin flat weights may be cemented or otherwise secured to the external blade surface. Although this results in a slightly roughened surface at the point of application, this particular type of weight device is very readily applied and does not require piercing or breaking of the blade covering.

In addition to the foregoing, I have found that the application of any suitable paste such as red lead, graphite, or the like, compounded in such a manner, preferably with some adhesive material, as to harden after application, affords a highly satisfactory method of applying the exact weight desired to each blade. Such material is preferably applied to the inside of the blade by means of a pressure gun having a very small diameter hollow needle. In this way, only a very small opening need be made in the blade covering and, as a result, such a hole may be very readily sealed or closed after insertion of the paste. When this means is adopted it is desirable to inject or deliver the paste into some corner or pocket of the internal blade structure so that, upon hardening, the paste is rigidly held in the desired location within the blade. It might also be noted that this last form of weight application is advantageous for the reason that it involves no alteration in blade contour whatever.

Referring now to Figure 7, attention is called to the detail showing of the mounting for the suspending pins 31 of Figures 3 to 6 inclusive, such mounting including anti-friction bearings, preferably of the ball type, as indicated at 31a. As a modification of this particular part of the structure, pins 31c having knife edges 31d (see Fig. 8) may also be employed. In such a construction, of course, the supporting angles 29 are preferably provided with relatively shallow and angled recesses 29a arranged to cooperate with the knife edges 31d. It might be noted in this connection that since it is highly desirable that the blade suspending pins should be mounted for movement with a minimum of friction, I prefer to use the ball bearing type of Figure 7, although the knife-edge arrangement of Figure 8 may also be employed for this purpose. The arrangement of Figure 7 is preferably for the reason that the characteristics of this type of bearing remain very uniform in a group thereof over a long period of use.

In Figure 9 I have illustrated somewhat different means of pendularly suspending the blades. According to this arrangement the forked joint part 33 of each blade is mounted on a suitable support 35 as by means of a bifurcated bracket 36, a joint part 37 and pins 38 and 39 in order to afford or provide for universal movement of the blade with respect to the support. In this figure, it will be seen, the blade 22 extends substantially horizontally from the hub end supporting structure. At its outer end portion, the blade is suspended as by means of a strap 40 and a wire or cord 41, the upper end of such wire or cord being secured to suitable stationary structure such as that indicated at 42. This arrangement, it is noted, is especially useful where the head room is somewhat limited.

As appears most clearly in Figures 10 and 11, the means by which the upper end of the cord 41 is attached to the support 42 includes a depending yoke device 43 suitably bolted to the support and apertured or arranged at its lower end to receive a pin 44. Midway between the two depending portions of the structure 43 the pin 44 carries an anti-friction bearing, preferably of the ball type, as indicated at 45, about which a collar 46 is arranged. At its lower side the collar 46 carries an apertured ear 47 to which the cable or cord 41 is attached as by means of a loop 48 formed at the end thereof.

In testing a plurality of blades by means of this modified supporting mechanism, as already noted, each blade is preferably swung individually and, of course, suitably timed to determine its pendular period. After such determination another blade may be set up in the same manner and suitably timed to determine its period. The equalization of the periods of blades tested in this manner, of course, may be effected in a manner similar to that already described in connection with Figures 3 and 4. It should be understood, however, that if desired a plurality of blades may be set up in accordance with the showing of Figure 9 and tested simultaneously in a manner similar to that already described.

Furthermore, with the construction of Figure 9, the blades may readily be swung and balanced on their ultimately horizontally disposed pivots, for example, by turning the supporting member 36 on to one end and correspondingly shifting the point of attachment of the cable 41 to the strap 40. I have found, however, that a very satisfactory condition of balance, as to both of the blade pivots, is usually provided by swinging and balancing in the manner fully described above, on the vertically arranged pivots of the blades.

According to the foregoing, therefore, the present invention provides a sustaining rotor construction for aircraft, the said construction including a plurality of individually articulated blades which are balanced or equalized as to their pendular periods of oscillation from the articulated joints thereof. The result of such a condition of balance, which, of course, is additional to the usual static weight balance, is greatly to improve rotor action in general during flight operation. I have found that rotor constructions having blades balanced in this manner are very even and practically vibrationless even during relatively fast forward flight at which time, of course, relatively large swinging movements of the individual blades take place.

In addition to the objects and advantages noted just above as well as at the beginning of this specification, the present invention makes provision for a simple and convenient method of balancing rotor blades during their manufacture, so that the above noted desirable balanced condition is readily attainable.

It will be obvious that in practicing the present invention a "master" rotor blade may be employed in testing and balancing any number of blades for a given type or size craft, so that in case replacements become necessary a new blade may be applied to a particular craft without removing the others therefrom for balancing purposes, for the reason that all blades whose periods have been equalized with that of the "master" may be interchanged at will.

The usefulness of the method employing one "master" blade, with respect to the building of large blades, will be apparent from the fact that the blades can be built and brought to pendular balance with a master without careful check for variations throughout each step in manufacture, the probability of variation and the amount of variation being greater in large rotors than in small ones.

I claim:

1. In an aircraft, a body, forward propelling means therefor, and a rotative sustaining system comprising an upwardly extending axis member with a plurality of blades individually pivotally mounted thereon and adapted to be rotated by relative air-flow, the general plane of said system being arranged relatively edgewise to forward flight direction so that said blades normally swing on their pivots, under the influence of forward flight forces, irregularly with respect to their field of rotation, and unsymmetrically with respect to each other at a given moment in their rotation, said rotative system as a whole being in substantially symmetrical weight balance with the blades in true radial position, and said blades being in substantial pendular balance, each to each, on their pivots.

2. In an aircraft, a body, forward propelling means therefor, and a rotative sustaining system comprising an upwardly extending axis member and a plurality of blades mounted for rotation with respect to the axis member by the action of relative air-flow and for individual swinging movement substantially forwardly and rearwardly within the general path of travel thereof, the general plane of said system being arranged relatively edgewise to forward flight direction so that said blades normally swing on their pivots, under the influence of forward flight forces, irregularly with respect to their field of rotation, and unsymmetrically with respect to each other at a given moment in their rotation, said rotative system as a whole being in substantially symmetrical weight balance with the blades in true radial position, and said blades being in substantial pendular balance, each to each, on their pivots.

3. In an aircraft, a body, forward propelling means therefor, and a rotative sustaining system comprising an upwardly extending axis member and a plurality of blades mounted for rotation with respect to the axis member by the action of relative air-flow and for individual swinging movement substantially within and transversely of the general path of travel thereof, the general plane of said system being arranged relatively edgewise to forward flight direction so that said blades normally swing on their pivots, under the influence of forward flight forces, irregularly with respect to their field of rotation, and unsymmetrically with respect to each other at a given moment in their rotation, said rotative system as a whole being in substantially symmetrical weight balance with the blades in true radial position, and said blades being in substantial pendular balance, each to each, on their pivots.

4. In the manufacture of a sustaining rotor construction of the articulated blade type, in which construction the blades are irregularly swung on their articulations by flight forces, the method of eliminating a tendency to resonant swinging which includes determining the natural pendular oscillation period of one blade and balancing another blade of the rotor, with respect to its natural pendular oscillation period, to conform to the period determined.

5. In the manufacture of a sustaining rotor construction of the articulated blade type, in which construction the blades are irregularly swung on their articulations by flight forces, the method of eliminating a tendency to resonant swinging which includes determining the natural pendular oscillation period of one blade and balancing another blade of the rotor, with respect to its natural pendular oscillation period, to conform to the period determined while maintaining the weight of the blades substantially equal to each other.

6. In the manufacture of a sustaining rotor construction including a set of more than two articulated blades, in which construction the blades are irregularly swung on their articulations by flight forces, the steps which include equalizing the natural pendular oscillation period of the two blades having, respectively, the longest and shortest periods, and balancing another blade of the set, with respect to its period, to conform to the first two after the equalization thereof.

7. In the manufacture of a sustaining rotor construction including a set of more than two articulated blades, in which construction the blades are irregularly swung on their articulations by flight forces, the steps which include equalizing the natural pendular oscillation period of the two blades having, respectively, the longest and shortest periods, while maintaining their weights substantially equal to each other, and balancing another blade of the set, with respect to its period, to conform to the first two after equalization thereof.

8. In the manufacture of a sustaining rotor construction of the articulated blade type, in which construction the blades are irregularly swung on their articulations by flight forces, the steps which include determining the natural pendular oscillation period of one blade and balancing another blade of the rotor, with respect to its natural pendular oscillation period, to conform to the period determined, and accomplishing the foregoing by altering the weight of the rotor while maintaining substantial uniformity as between the weights of the blades.

9. In the manufacture of a sustaining rotor construction of the articulated blade type, in which construction the blades are irregularly swung on their articulations by flight forces, the steps which include determining the natural pendular oscillation period of one blade and balancing another blade of the rotor, with respect to its natural pendular oscillation period, to conform to the period determined, by altering the weights of the blades a substantially equal amount but in different portions thereof as between the two blades.

10. In the manufacture of a sustaining rotor construction of the articulated blade type, in which construction the blades are irregularly swung on their articulations by flight forces, the steps which include determining the natural pendular oscillation period of one blade and balancing another blade of the rotor, with respect to its natural pendular oscillation period, to conform to the period determined, by adding substantially equal weights to the blades in different portions thereof as between the two blades.

11. In the manufacture of a sustaining rotor construction of the articulated blade type, in which construction the blades are irregularly swung on their articulations by flight forces, the method of eliminating a tendency to resonant swinging which includes balancing the blades with respect to their weights first statically and then dynamically.

12. In the manufacture of a sustaining rotor construction of the articulated blade type, in which construction the blades are irregularly swung on their articulations by flight forces, the steps which include balancing the blades with respect to their weights first statically and then dynamically, the dynamic balance being accomplished by altering the weight of the rotor while maintaining substantially uniformity as between the weights of the blades.

13. In the manufacture of a sustaining rotor construction of the articulated blade type, in which construction the blades are irregularly swung on their articulations by flight forces, the steps which include first balancing the blades with respect to their weights and center of gravity location, and then balancing the blades dynamically.

14. In the manufacture of a sustaining rotor construction of the articulated blade type, in which construction the blades are irregularly swung on their articulations by fight forces, the steps which include balancing the blades with respect to their weights and center of gravity location, and then balancing the blades dynamically, the dynamic balance being accomplished by altering the weight of the rotor while maintaining substantially uniformity as between the weights of the blades.

15. In the manufacture of a sustaining rotor construction of the articulated blade type, in which construction the blades are irregularly swung on their articulations by flight forces, the steps which include balancing the blades with respect to their weights statically and dynamically, the dynamic balance being accomplished in such manner as to maintain the weights of the several blades substantially equal to each other.

16. In the manufacture of a sustaining rotor construction of the articulated blade type, in which construction the blades are irregularly swung on their articulations by flight forces, the steps which include balancing the blades with respect to their weights first statically and then dynamically, the dynamic balance being accomplished in such manner as to maintain the weights of the several blades substantially equal to each other.

17. In the manufacture of a sustaining rotor construction of the articulated blade type, in which construction the blades are irregularly swung on their articulations by flight forces, the steps which include determining the natural pendular oscillation period of one blade and balancing another blade of the rotor, with respect to its natural pendular oscillation period, to conform to the period determined, by adding substantially equal weights to the blades in different portions thereof as between the two blades, the addition of weight being accomplished by the application thereof to the external surface of the blades.

18. In the manufacture of a sustaining rotor construction of the articulated blade type, in which construction the blades are irregularly swung on their articulations by flight forces, the steps which include determining the natural pendular oscillation period of one blade and balancing another blade of the rotor, with respect to its natural pendular oscillation period, to conform to the period determined, by adding substantially equal weights to the blades in different portions thereof as between the two blades, the addition of weight being accomplished by an irregular application of a blade surfacing material.

19. In the manufacture of a sustaining rotor construction of the articulated blade type, in which construction the blades are irregularly swung on their articulations by flight forces, the steps which include determining the natural pendular oscillation period of one blade and balancing another blade of the rotor, with respect to its natural pendular oscillation period, to conform to the period determined, by altering the weights of the blades a substantially equal amount but in different portions thereof as between the two blades, the alteration of the weights of the blades being accomplished internally thereof.

20. In the manufacture of a sustaining rotor construction of the articulated blade type, in which construction the blades are irregularly swung on their articulations by flight forces, the steps which include determining the natural pendular oscillation period of one blade and balancing another blade of the rotor, with respect to its natural pendular oscillation period, to conform to the period determined, by adding substantially equal weights to the blades in different portions thereof as between the two blades, the addition of weights being internally of the blades.

21. In the manufacture of a sustaining rotor construction of the articulated blade type, in which construction the blades are irregularly swung on their articulations by flight forces, the steps which includes pendularly balancing a plurality of blades by application and adjustment of temporary weight devices and subsequent replacement of the temporary weight devices by permanent weights.

22. In the manufacture of a sustaining rotor construction of the articulated blade type, in which construction the blades are irregularly swung on their articulations by flight forces, the steps which include pendularly balancing a plurality of blades by application and adjustment of temporary weight devices and subsequent replacement of the temporary weight devices by permanent weights in the form of blade surfacing material.

23. In the manufacture of a sustaining rotor construction of the articulative blade type, in which construction the blades are irregularly swung on their articulations by flight forces, the steps which include pendularly balancing a plurality of blades by application and adjustment of temporary weight devices and subsequent replacement of the temporary weight devices by permanent weights applied internally of the blades.

24. In the manufacture of a sustaining rotor construction of the articulated blade type, in which construction the blades are irregularly swung on their articulations by flight forces, the steps which include swinging the blades on their articulations to determine their natural pendular oscillation periods and altering the weights of the blades in different portions thereof as between blades to equalize their pendular periods.

25. In the manufacture of a sustaining rotor construction of the articulated blade type, in which construction the blades are irregularly swung on their articulations by flight forces, the steps which include balancing each blade of the rotor, with respect to its pendular period of oscillation, to conform to that of a master blade by altering the weight of each blade being balanced an equal amount but in different portions thereof in such blades as have pendular periods different from that of the master.

26. In the manufacture of a sustaining rotor construction of the articulated blade type, in which construction the blades are irregularly swung on their articulations by flight forces, the steps which include balancing each blade of the rotor, with respect to its pendular period of oscillation, to conform to that of a master blade by swinging each blade with the master and adding, to each blade being balanced, an equal weight so positioned thereon as to ensure pendular oscillation thereof at a rate equal to the pendular oscillation of the master.

27. In the manufacture of a sustaining rotor construction of the articulated blade type, in which construction the blades are irregularly swung on their articulations by flight forces, the steps which include determining the natural pendular oscillation period of one blade and balancing another blade of the rotor, with respect to its natural pendular oscillation period, to conform to the period determined while maintaining the weight of the blades substantially equal to each other.

28. In the manufacture of a sustaining rotor construction of the articulated blade type, in which construction the blades are irregularly swung on their articulations by flight forces, the steps which include balancing the blades with respect to their weights first statically and then dynamically.

In testimony whereof I have hereunto signed my name.

PAUL H. STANLEY.